US012768652B2

(12) United States Patent
Stepp et al.

(10) Patent No.: US 12,768,652 B2
(45) Date of Patent: Oct. 20, 2026

(54) AIRCRAFT FLIGHT CONTROL USING SUBPIXEL LOCALIZATION

(71) Applicant: The Boeing Company, Arlington, VA (US)

(72) Inventors: Nigel David Stepp, Santa Monica, CA (US); Rongsheng Li, Menifee, CA (US); Minh Binh Nguyen, Thousand Oaks, CA (US); Michael Robert Hooi, Tualatin, OR (US)

(73) Assignee: The Boeing Company, Arlington, VA (US)

( * ) Notice: Subject to any disclaimer, the term of this patent is extended or adjusted under 35 U.S.C. 154(b) by 25 days.

(21) Appl. No.: 18/965,703

(22) Filed: Dec. 2, 2024

(65) Prior Publication Data

US 2026/0153335 A1 Jun. 4, 2026

(51) Int. Cl.
*G01C 21/02* (2006.01)
*G06T 7/70* (2017.01)

(52) U.S. Cl.
CPC .............. *G01C 21/025* (2013.01); *G06T 7/70* (2017.01); *G06T 2207/10032* (2013.01); *G06T 2207/20076* (2013.01); *G06T 2207/20081* (2013.01); *G06T 2207/20084* (2013.01); *G06T 2207/30248* (2013.01)

(58) Field of Classification Search
CPC .................... G01C 21/025; G06T 7/70; G06T 2207/10032; G06T 2207/20076; G06T 2207/20081; G06T 2207/20084; G06T 2207/30248
See application file for complete search history.

(56) References Cited

U.S. PATENT DOCUMENTS 12,307,638 B1 * 5/2025 Pelletier .................... G06T 5/92
2008/0195316 A1 * 8/2008 Krishnaswamy ...... G05D 1/027 348/E5.066
2023/0215039 A1 * 7/2023 Pignol .................... B64G 1/361 382/103

OTHER PUBLICATIONS

Nehme et al., "Deep-STORM: Super-Resolution Single-Molecule Microscopy by Deep Learning," Optica, vol. 5, No. 4, Apr. 2018, pp. 458-464. https://opg.optica.org/directpdfaccess/4b1a1562-fbec-4321-8fc5a3cf88096714_385495/optica-5-4-458.pdf?da=1&id=385495&seq=0&mobile=no.

Schroeter et al., "Learning Multi-Instance Sub-pixel Point Localization," Proceedings of the Asian Conference on Computer Vision (ACCV), 2020, 17 pages. https://openaccess.thecvf.com/content/ACCV2020/papers/Schroeter_Learning_Multi-Instance_Sub-pixel_Point_Localization_ACCV_2020_paper.pdf.

* cited by examiner

*Primary Examiner* — Navid Z. Mehdizadeh
*Assistant Examiner* — Oliver Tan
(74) *Attorney, Agent, or Firm* — Yee & Associates, P.C.

(57) ABSTRACT

A method for controlling a movement of a vehicle is provided. An input image is received in which stars are present from a camera system for the vehicle. A subpixel probability image is generated by a machine learning model system from the input image in which the stars are present. The input image is comprised of pixels and the subpixel probability image is comprised of subpixel coordinates describing subpixel locations having probabilities of a presence of the stars. The subpixel coordinates for the subpixel locations of the stars is generated from the subpixel probability image. An orientation of the vehicle is determined using the subpixel coordinates for the subpixel locations of the stars. The movement of the vehicle is controlled using the orientation of the vehicle.

19 Claims, 13 Drawing Sheets

801

| | 116 | 117 | 118 | 119 | 120 | 121 | 122 | 123 |
|---|---|---|---|---|---|---|---|---|
| 197 | -0.02 | -0.03 | 0.01 | 0.02 | 0.05 | -0.02 | 0.00 | -0.03 |
| 198 | -0.01 | -0.00 | 0.03 | 0.11 | 0.13 | 0.07 | -0.04 | 0.02 |
| 199 | -0.03 | 0.06 | 0.11 | 0.23 | 0.35 | 0.23 | -0.01 | -0.05 |
| 200 | 0.02 | 0.06 | 0.14 | 0.37 | 0.71 | 0.34 | -0.04 | -0.05 |
| 201 | -0.02 | 0.01 | 0.16 | 0.52 | 0.88 | 0.39 | -0.04 | -0.03 |
| 202 | -0.03 | 0.04 | 0.19 | 0.49 | 0.81 | 0.28 | -0.04 | 0.03 |
| 203 | -0.01 | 0.03 | 0.22 | 0.43 | 0.62 | 0.12 | -0.02 | 0.03 |
| 204 | 0.00 | 0.03 | 0.14 | 0.24 | 0.25 | 0.06 | -0.02 | -0.02 |

802

| | 116 | 117 | 118 | 119 | 120 | 121 | 122 | 123 |
|---|---|---|---|---|---|---|---|---|
| 197 | 0.00 | 0.00 | 0.00 | 0.00 | 0.00 | 0.00 | 0.00 | 0.00 |
| 198 | 0.00 | 0.00 | 0.00 | 0.00 | 0.00 | 0.00 | 0.00 | 0.00 |
| 199 | 0.00 | 0.00 | 0.00 | 0.00 | 0.00 | 0.00 | 0.00 | 0.00 |
| 200 | 0.00 | 0.00 | 0.00 | 0.00 | 0.00 | 0.00 | 0.00 | 0.00 |
| 201 | 0.00 | 0.00 | 0.00 | 0.08 | 0.66 | 0.00 | 0.00 | 0.00 |
| 202 | 0.00 | 0.00 | 0.00 | 0.03 | 0.23 | 0.00 | 0.00 | 0.00 |
| 203 | 0.00 | 0.00 | 0.00 | 0.00 | 0.00 | 0.00 | 0.00 | 0.00 |
| 204 | 0.00 | 0.00 | 0.00 | 0.00 | 0.00 | 0.00 | 0.00 | 0.00 |

803

| | 116 | 117 | 118 | 119 | 120 | 121 | 122 | 123 |
|---|---|---|---|---|---|---|---|---|
| 197 | 0.00 | 0.00 | 0.00 | 0.00 | 0.00 | 0.00 | 0.00 | 0.00 |
| 198 | 0.00 | 0.00 | 0.00 | 0.00 | 0.00 | 0.00 | 0.00 | 0.00 |
| 199 | 0.00 | 0.00 | 0.00 | 0.00 | 0.00 | 0.00 | 0.00 | 0.00 |
| 200 | 0.00 | 0.00 | 0.00 | 0.00 | 0.00 | 0.00 | 0.00 | 0.00 |
| 201 | 0.00 | 0.00 | 0.00 | 0.18 | 0.58 | 0.01 | 0.00 | 0.00 |
| 202 | 0.00 | 0.00 | 0.00 | 0.07 | 0.27 | 0.00 | 0.00 | 0.00 |
| 203 | 0.00 | 0.00 | 0.00 | 0.00 | 0.00 | 0.00 | 0.00 | 0.00 |
| 204 | 0.00 | 0.00 | 0.00 | 0.00 | 0.00 | 0.00 | 0.00 | 0.00 |

AIRCRAFT FLIGHT CONTROL USING SUBPIXEL LOCALIZATION

BACKGROUND INFORMATION

1. Field

The present disclosure relates generally to an improved aircraft and in particular, to a computer system in the aircraft that controls a flight of the aircraft using subpixel localization.

2. Background

Vehicle navigation involves determining the position of a vehicle and routing the vehicle to a destination. Determining the position of a vehicle includes the location and orientation of the vehicle. For example, with an aircraft, satellite, or land-based vehicle the orientation of the vehicle can include an attitude for the vehicle.

In determining the position of the vehicle, various technologies can be used. For example, a global positioning system using signals from satellites can be used to determine the location of the vehicle. As another example, an inertial navigation system can also be used in vehicles including aircraft, satellite, and land-based vehicles.

As another example, star tracking can be used to determine the orientation of the aircraft, satellite, or land-based vehicle. With star tracking, observation of the location of stars can be used to determine the orientation of the vehicle. This type of navigation can be used by various types of vehicles, including ships, aircraft, land-based systems, and spacecraft. With this type of navigation, a star tracker is a system that captures star patterns. Those patterns are compared with a star catalog to determine the orientation of the vehicle. A star catalog is a database of stars that includes the positions, magnitudes, and other data about stars that can be used to determine the orientation of a vehicle. This orientation can then be used by the navigation system to move the aircraft along a path to a destination.

SUMMARY

An illustrative example of the present disclosure provides a vehicle control system comprising a computer system, a machine learning model system, a star locator, and a vehicle controller for a vehicle. The machine learning model system is located in the computer system. The machine learning model system has been trained to generate a subpixel probability image from an input image in which stars are present. The input image is comprised of pixels and the subpixel probability image is comprised of subpixel coordinates describing subpixel locations having probabilities of a presence of the stars. The star locator is located in the computer system. The star locator is configured to receive the input image in which the stars are present from a camera system for the vehicle. The star locator is configured to send the input image to the machine learning model system. The star locator is configured to receive the subpixel probability image from the machine learning model system in response to sending the input image to the machine learning model system. The star locator is configured to determine the subpixel coordinates for the subpixel locations of the stars using the subpixel probability image. The vehicle controller for the vehicle is located in the computer system. The vehicle controller is configured to determine an orientation of the vehicle using the subpixel coordinates for the subpixel locations of the stars. The vehicle controller is configured to control a movement of the vehicle using the orientation of the vehicle.

In another illustrative example, a star navigation system comprises a set of computer-readable storage media and program instructions stored on the set of computer-readable storage media to perform operations. The operations comprise receiving an input image in which the stars are present from a camera system for a vehicle. The operations comprise generating a subpixel probability image from the input image using a machine learning model system trained to generate the subpixel probability image from the input image. The input image is comprised of pixels and the subpixel probability image is comprised of the subpixel coordinates describing the subpixel locations having probabilities of a presence of the stars. The operations comprise determining the subpixel coordinates for the subpixel locations of the stars from the subpixel probability image.

In another illustrative example of the present disclosure, a method for controlling a movement of a vehicle is provided. An input image in which stars are present is received from a camera system for the vehicle. A subpixel probability image is generated from the input image in which the stars are present using a machine learning model system, wherein the input image is comprised of pixels and the subpixel probability image is comprised of subpixel coordinates describing subpixel locations having probabilities of a presence of the stars. The subpixel coordinates for the subpixel locations of the stars is determined from the subpixel probability image. An orientation of the vehicle is determined using the subpixel coordinates for the subpixel locations of the stars. The movement of the vehicle is controlled using the orientation of the vehicle.

In still another illustrative example of the present disclosure, a computer program product is provided for locating a star. A computer program product for locating a star, the computer program product comprising a computer-readable storage medium having program instructions embodied therewith, the program instructions executable by a computer system to cause the computer system to perform a method of receiving an input image in which the stars are present from a camera system for a vehicle; receiving subpixel coordinates for subpixel locations of the stars in response to sending the input image into a machine learning model system, wherein the machine learning model system has been trained to generate a subpixel probability image from the input image in which stars are present, wherein the input image is comprised of pixels and the subpixel probability image is comprised of subpixel coordinates describing subpixel locations having probabilities of a presence of the stars; and generating the subpixel coordinates for the subpixel locations of the stars from the subpixel probability image.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
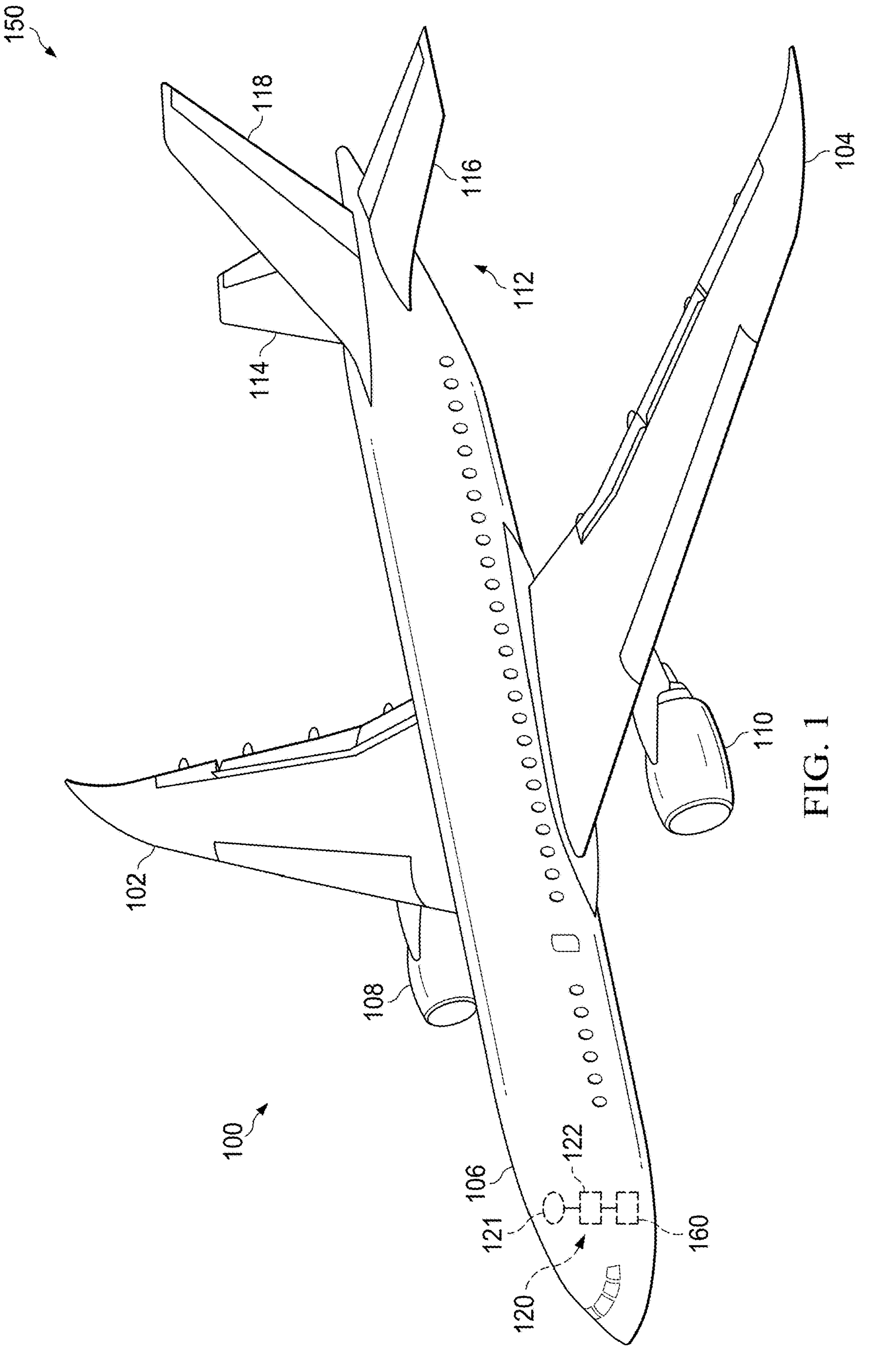
FIG. 1 is an illustration of an aircraft in accordance with an illustrative embodiment.

The illustrative embodiments recognize and take into account one or more different considerations as described herein. For example, at night determining the orientation and derived position of the vehicle using stars is highly effective as stars are clearly visible against a dark sky. During the day, however, the brightness of the sky can overwhelm light from the stars making traditional star tracking difficult or impossible.

Star tracking during the day can be important in situations in which global positioning system signals cannot be received or are unreliable. This type of orientation determination can be especially useful for determining orientation information such as the attitude of aircraft in GPS denied environments.

With daytime star tracking, sensors can be used to detect light from stars at a particular wavelength that is not overwhelmed by sunlight. The sensors include, for example, infrared sensors. Additionally, filtering of the sunlight can be performed on specific areas of the sky to account for daylight interference.

Determining the location of stars within images with an accuracy that enables matching stars in an image with stars in a star catalog is needed for determining the orientation of an aircraft. The images generated by the camera system are comprised of pixels. However, identifying the pixels in which stars are located in an image does not provide a desired level of accuracy to match the stars identified in the image with stars in the star catalog.

This issue with determining the location of a star using an image comprising pixels increases when the images are generated during the day, resulting in an inability to provide a desired level of accuracy to locate the stars in the image based on pixel locations in the image. In this situation, determining the location of stars using subpixel coordinates is performed to provide increased accuracy.

In the illustrative example, star coordinates can be identified in subpixel images. A subpixel image is an image in which the representation of features or details such as the location of stars is refined beyond the standard pixel resolution in images generated by camera systems. For example, subpixel images can be generated from images in which a higher accuracy in representing the locations of stars in the image are provided resulting in greater accuracy in star location than the actual pixel grid in currently used images.

In this example, subpixel coordinates are locations within pixel coordinates that refer to locations within a pixel that can represent finer locations than the grid-based location of the pixels. For example, in a digital image, a pixel is represented by an integer coordinate that corresponds to a specific location in the pixel grid. The subpixel coordinates can be represented using floating-point values. These floating-point values allow for more precise positioning within the boundaries of a single pixel.

In the illustrative example, a star locator can receive an image comprising pixels in which stars are present. The star locator can generate a subpixel image that encodes locations of the stars using subpixel coordinates. In this illustrative example, the star locator uses a machine learning model in the form of a convolutional neural network (CNN) to generate subpixel coordinates for stars from images of stars comprising pixels.

For example, when used with aircraft, the convolutional neural network can be trained to generate a subpixel image with subpixel coordinates for subpixel locations in which the probability of the presence of a star is associated with each subpixel location. This subpixel image can be analyzed to identify subpixel locations that contain stars. The identification of the subpixel locations can be used by a flight controller for precise navigation and control during flight of the aircraft.

If a target coordinate falls within the convex hull of the center points of a 2×2 array of pixels, then the value at each of those pixels is such that the weighted sum of the value multiplied by the pixel coordinates equals the target coordinate. The convolutional neural network predicts these values. A post-processing step is performed that sums each 2×2 grid in the output image representing the overall probability that the 2×2 grid contains a star.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which star tracker system 120 is implemented in accordance with an illustrative embodiment. In this illustrative example, star tracker system 120 is located in aircraft 100 and operates to generate information about stars that can be used to control the movement of aircraft 100. As depicted, star tracker system 120 comprises star tracker system 122 and camera 121.

In this example, camera 121 generates images of stars in sky 150. These images can be generated in daylight as well as at night. The images generated by camera 121 comprise pixels. Identifying stars in the images with a desired level of accuracy for controlling movement of aircraft 100 can require identifying locations of the stars in subpixel coordinates in the images even though the images only provide intensities on a pixel level basis. In this example, star tracker system 122 can infer subpixel coordinates based on the discrete pixel intensities in the images to identify the locations of stars within the images.

By detecting stars in subpixel coordinates, star tracker system 122 can identify the orientation of aircraft 100. This position can include a location in three-dimensional coordinates such as in a Cartesian coordinate system. Further, this position can also include an orientation of aircraft 100. This position can include, for example, attitude. Other types of position information that can be identified include heading, bank angle, pitch, and other types of information that describe the position of aircraft 100.

This information can be used to control movement of aircraft 100 through controlling at least one of an orientation, a heading, a direction, a speed, an acceleration, a route of the aircraft 100, or other types of movement of aircraft 100. In these examples, this movement can be controlled directly through the use of the star locations identified in the images.

In another illustrative example, the movement of aircraft 100 can be controlled indirectly using the information from star tracker system 122. For example, the information about star locations can be used to update measurements received from inertial measurement unit (IMU) 160. Inertial measurement unit 160 can be used when a global positioning system is absent from aircraft 100 or the global positioning system unit is unable to receive signals in a manner that provides desired accuracy in determining the location of aircraft 100.

Inertial measurement unit 160 can provide information about force, angular rate, and magnetic field. This information can be used to determine the orientation and motion of aircraft 100. For example, this information can be used to determine location, velocity, and attitude of aircraft 100.

These measurements, however, can drift over time in which errors can occur. These errors can result in inaccuracies of measurements. The information determined from star tracker system 122 can be used to correct for the drift in measurements received from inertial measurement unit 160.

Figure 2:
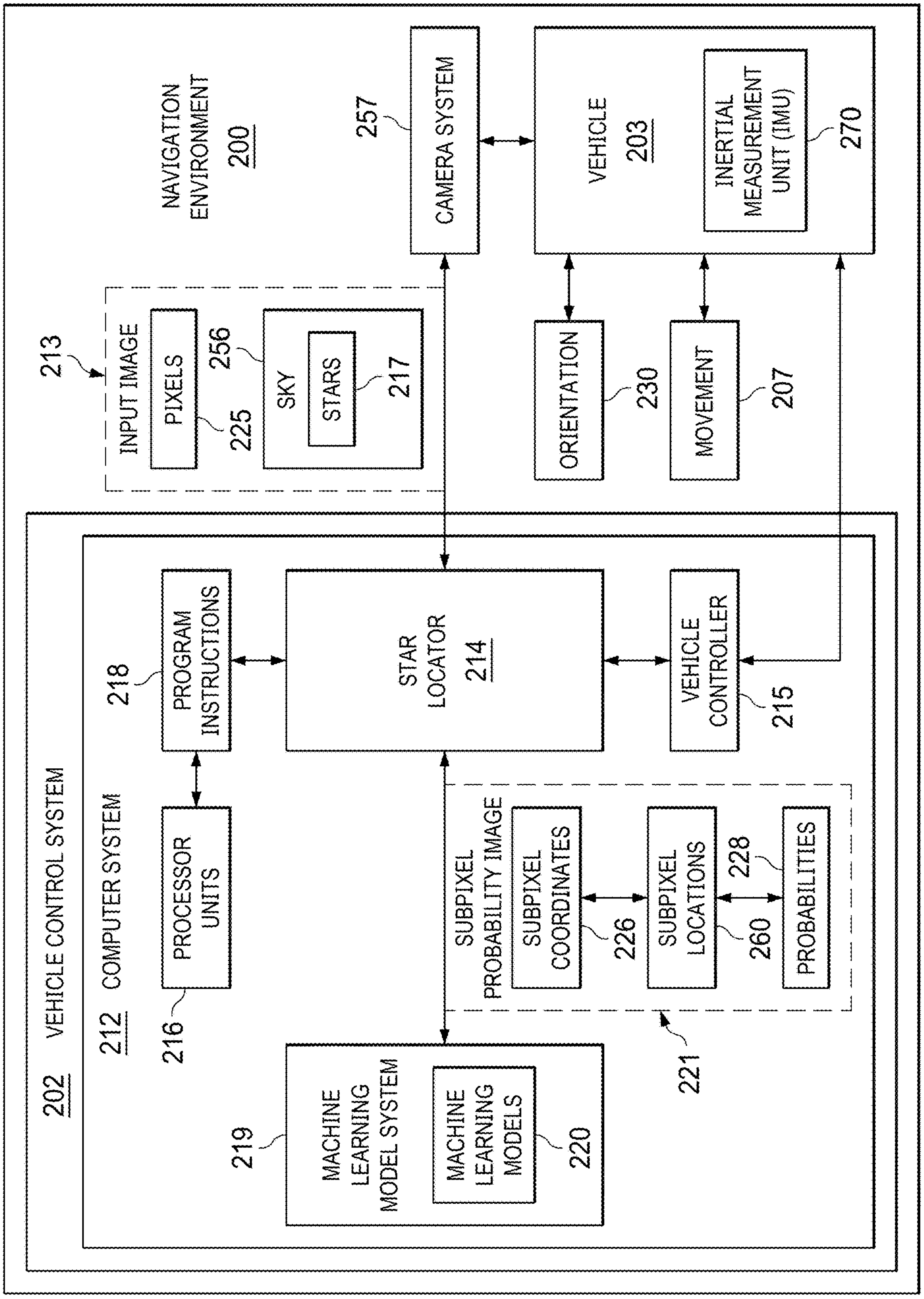
FIG. 2 is a block diagram of a navigation environment in accordance with an illustrative embodiment.

With reference now to FIG. 2, a block diagram of a navigation environment is depicted in accordance with an illustrative embodiment. In this illustrative example, vehicle control system 202 in navigation environment 200 operates to control the movement 207 of vehicle 203. Vehicle 203 can take a number of different forms. For example, vehicle 203 can be selected from a group comprising a mobile platform, an aircraft, a commercial airplane, a cargo airplane, a tilt-rotor aircraft, a tilt wing aircraft, a vertical takeoff and landing aircraft, an unmanned aerial vehicle, an artificial intelligence controlled vehicle, a drone, an electric vertical takeoff and landing vehicle, a personal air vehicle, a surface ship, a tank, a personnel carrier, a train, a spacecraft, a satellite, a space station, a submarine, a bus, a land-based system, an automobile, and other types of vehicles that can use a vehicle control system.

In this illustrative example, vehicle control system 202 comprises a number of different components. As depicted, vehicle control system 202 comprises computer system 212, star locator 214, and vehicle controller 215.

Star locator 214 and vehicle controller 215 can be implemented in software, hardware, firmware or a combination thereof. When software is used, the operations performed by star locator 214 and vehicle controller 215 can be implemented in program instructions configured to run on hardware, such as a processor unit. When firmware is used, the operations performed by star locator 214 and vehicle controller 215 can be implemented in program instructions and data and stored in persistent memory to run on a processor unit. When hardware is employed, the hardware can include circuits that operate to perform the operations in star locator 214 and vehicle controller 215.

In the illustrative examples, the hardware can take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 212 is a physical hardware system and includes one or more data processing systems. When more than one data processing system is present in computer system 212, those data processing systems are in communication with each other using a communications medium.

The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer-readable program instructions.

As used herein, a processor unit in the number of processor units 216 is a hardware device and is comprised of hardware circuits such as those on an integrated circuit that respond to and process instructions and program code that operate a computer.

When the number of processor units 216 executes program instructions 218 for a process, the number of processor units 216 can be one or more processor units that are in the same computer or in different computers. In other words, the process can be distributed between processor units 216 on the same or different computers in computer system 212.

Further, the number of processor units 216 can be of the same type or different types of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this example, star locator 214 receives input image 213 of sky 256 in which stars 217 are present. This image is received from camera system 257 for vehicle 203.

In this illustrative example, camera system 257 comprises one or more cameras. These cameras are selected to be able to detect stars 217 in sky 256 at different amounts of light. For example, camera system 257 can be selected to have sensors that detect light from stars 217 in daylight as well as night.

Star locator 214 sends input image 213 into machine learning model system 219. In this illustrative example, machine learning model system 219 is a number of machine learning models 220. These machine learning models can be selected from at least one of a centroid quad network, a convolutional neural network, a recurrent neural network, a generative adversarial network, or other type of machine learning model that can be trained to generate subpixel coordinates in an image comprised of pixel coordinates.

In the illustrative example, machine learning model system 219 has been trained to generate a subpixel probability image 221 from input image 213 in which stars 217 are present. Further in this example, input image 213 and subpixel probability image 221 are the same size.

Input image 213 is comprised of pixels 225. In this illustrative example, subpixel probability image 221 is comprised of subpixel coordinates 226 describing subpixel locations 260 having probabilities 228 of a presence of stars 217. In this example, each subpixel location described by subpixel coordinates 226 in subpixel probability image 221 includes a probability that a star is present at subpixel locations 260. In this example, the probability is for a presence of the center of a star at the subpixel location described by the subpixel coordinates.

Machine learning model system 219 outputs subpixel probability image 221, which is received by star locator 214. In this example, star locator 214 determines subpixel coordinates 226 for subpixel locations 260 of stars 217 from subpixel probability image 221. Star locator 214 identifies which of subpixel coordinates 226 describe subpixel locations 260 of stars 217 using probabilities 228. For example, a threshold imbues to determine when a probability in probabilities 228 is great enough to indicate a sublocation of a star.

This identification of specific subpixel coordinates for stars 217 are subpixel coordinates 226 generated for subpixel locations 260 of stars 217. Star locator 214 sends subpixel coordinates 226 for subpixel locations 260 of stars 217 to vehicle controller 215.

In this example, vehicle controller 215 determines orientation 230 of vehicle 203 using the subpixel coordinates 226 for subpixel locations 260 of stars 217 received from star locator 214. Vehicle controller 215 controls movement 207 of vehicle 203 using orientation 230 of vehicle 203. In controlling movement 207 of vehicle 203, vehicle controller 215 controls at least one of an orientation, a heading, a direction, a speed, an acceleration, a route of the vehicle, or other aspect in movement 207 of vehicle 203.

In one illustrative example, orientation 230 determined for vehicle 203 can be used to control movement 207 of vehicle 203 in an orientation such as an attitude. Changing the attitude can change the path of movement 207 of vehicle 203.

In yet another relative example, subpixel coordinates 226 for subpixel locations 260 of stars 217 can be used to indirectly control movement 207 of vehicle 203. For example, vehicle 203 can include inertial measurement unit (IMU) 270. Inertial measurement unit 270 can have drift over time. The accumulation of errors in the sensor readings over time by inertial measurement unit 270 can lead to inaccuracies in at least one of position, velocity, or orientation estimates made by inertial measurement unit 270.

The accelerometers and gyroscopes in inertial measurement unit 270 measures acceleration and angular velocity. These sensors are prone to small errors and noise. Over time, these small inaccuracies compound, causing inertial measurement unit 270 to generate output that drifts away from the correct values.

These errors can continue to increase without external corrections. In this example, star locator 214 provides orientation 230 using machine learning model system 219. Orientation 230 is used to correct for drift in measurements received from inertial measurement unit 270.

In another illustrative example, vehicle 203 is an aircraft. With this example, vehicle controller 215 controls an attitude of the aircraft using orientation 230 of the aircraft determined using subpixel coordinates 226 for subpixel locations 260 of stars 217.

In one illustrative example, one or more technical solutions are present that overcome a technical problem with determining the orientation and derived position of a vehicle when global positioning system signals cannot be received or are unreliable. As a result, one or more technical solutions may provide a technical effect enabling determining an orientation of a vehicle using images generated in daylight. This issue with determining the location of stars for use in determining orientation from images comprising pixels increases when the images are generated during the day. The generation of these images during the day can result in an inability to provide a desired level of accuracy to locate the stars in the image based on pixel locations in the image. The illustrative examples enable determining locations of stars when the images of the sky generated during the day results in an inability to provide a desired level of accuracy to locate the stars in the image based on pixel locations in the image.

Computer system 212 can be configured to perform at least one of the steps, operations, or actions described in the different illustrative examples using software, hardware, firmware or a combination thereof. In particular, star locator 214 and vehicle controller 215 transforms computer system 212 into a special purpose computer system as compared to currently available general computer systems that do not have star locator 214 and vehicle controller 215.

The illustration of navigation environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, star locator 214 can be used with a vehicle that is a stationary platform such as a land-based system. In this example, the orientation of the land-based system can be used to determine a proper alignment of communications components for communications with satellites, a space station, or other communications systems. In some cases, the land-based system may be non-mobile.

Figure 3:
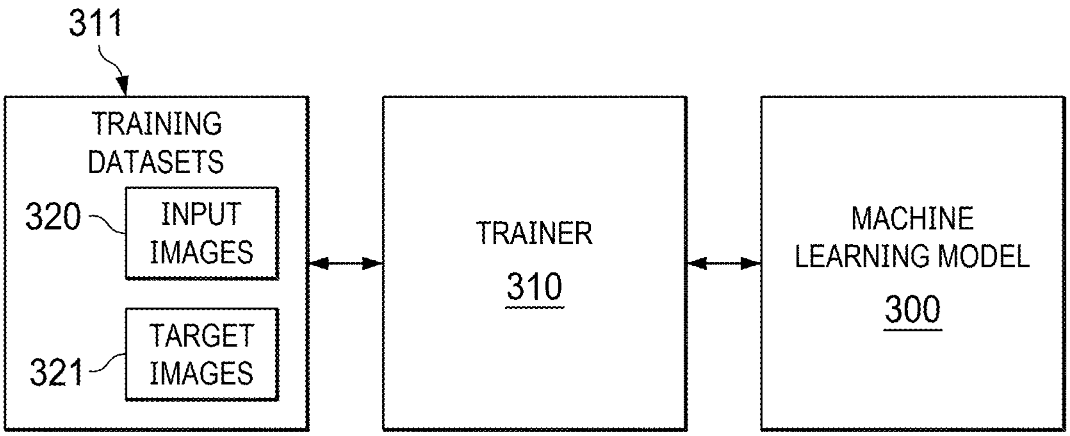
FIG. 3 is an illustration of a training system for a machine learning model system in accordance with an illustrative embodiment.

Turning now to FIG. 3, an illustration of a training system for a machine learning model system is depicted in accordance with an illustrative embodiment. In this illustrative example, trainer 310 can operate to train machine learning model 300. This machine learning model is an example of a machine learning model in machine learning models 220 in machine learning model system 219 in FIG. 2. Machine learning model 300 can be for example, a centroid quad network, a convolutional neural network, or some other machine learning model that can determine subpixel coordinates within pixel coordinates in an image.

Trainer 310 can train machine learning model 300 using training datasets 311. These training datasets can comprise input images 320 and target images 321. Input images 320 are images of stars generated by a camera. Target images 321 are subpixel probability images generated from corresponding to the input images 320. In this example, an input image has a corresponding target image comprising subpixel coordinates with subpixel locations in which each subpixel location has a probability that a star is present at that subpixel location. This target image has the correct values for the probabilities that should be determined by machine learning model 300 preprocessing the input image. Thus, these target images provide the ground truth for the probability that stars are present in subpixel locations for stars in input images 320.

Figure 4:
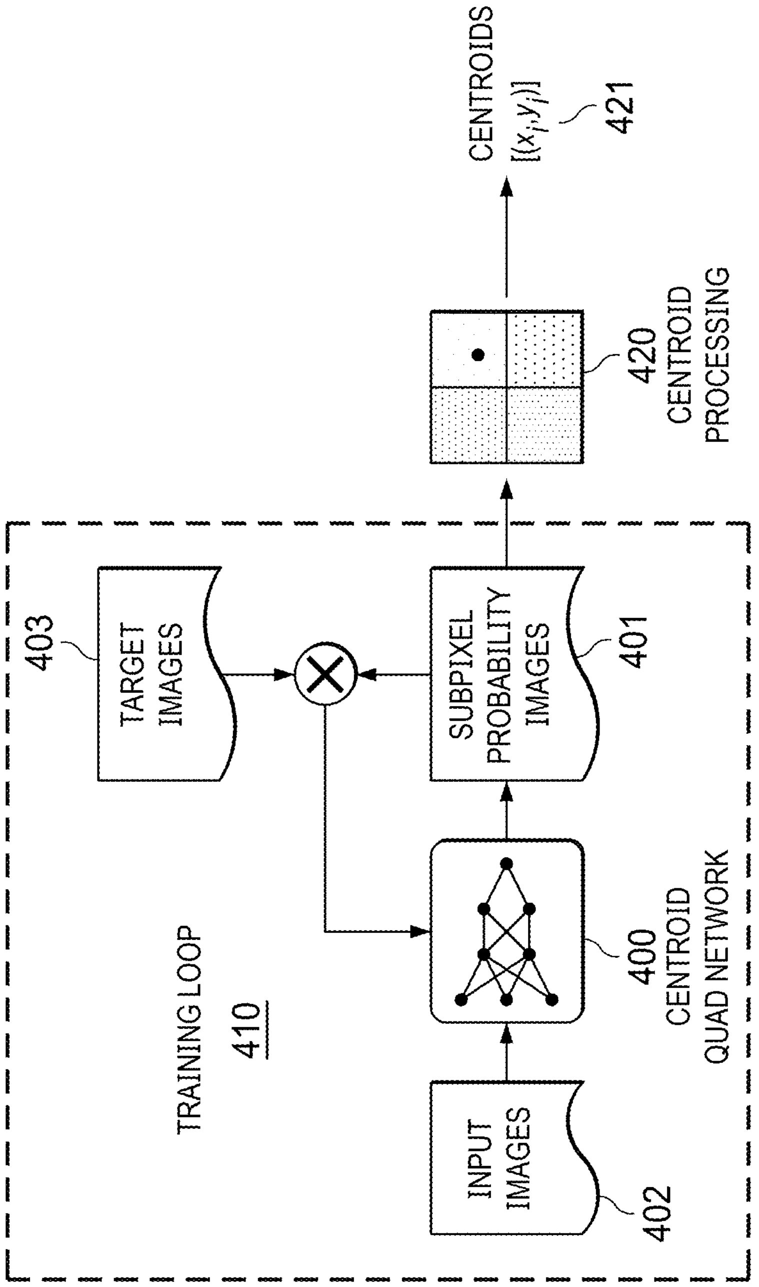
FIG. 4 is an illustration of a process for training a centroid quad network to generate pixel coordinates for subpixel locations of stars detected in input images in accordance with an illustrative embodiment.

Turning next to FIG. 4, an illustration of a process for training a centroid quad network to generate pixel coordinates for subpixel locations of stars detected in input images is depicted in accordance with an illustrative embodiment. In this illustrative example, centroid quad network 400 is trained to generate subpixel probability images 401 in response to receiving input images 402.

In this example, training is performed using training loop 410. As depicted, input images 402 are input into centroid quad network 400. In response, centroid quad network 400 outputs subpixel probability images 401. These images are compared to target images 403. In this example, target images 403 are subpixel probability images having the correct or ground truth values for the corresponding input images in input images 402. These target images can be generated from star ground truth locations for stars that are located in input images 402.

The comparison between subpixel probability images 401 and target images 403 results in errors that are used to adjust weights in centroid quad network 400 such that further processing reduces the errors generated between target images 403 and subpixel probability images 401.

Further in this illustrative example, postprocessing of subpixel probability images 401 can be performed using centroid processing 420. This type of processing can be performed to determine the location of a star within a subpixel probability image at a finer resolution than the pixel in input images 402. In this example, this process includes determining a weighted average of the importance using provided probabilities. In one illustrative example, this processing is performed for subpixel locations in a 2×2 pixel area of the image.

Centroid processing 420 outputs centroids 421. In this illustrative example, centroids 421 are subpixel coordinates describing subpixel locations of stars in input images 402. For example, centroids 421 can be an example of subpixel coordinates 226 for subpixel locations 260 of stars 217 in FIG. 2.

The training of centroid quad network 400 is presented as one example of training a machine learning model and is not meant to limit the manner in which other machine learning models can be trained. For example, other types of machine learning models can be trained in addition to or in place of centroid quad network 400. For example, this training can be applied to a machine learning model system that is selected from at least one of a convolutional neural network, a recurrent neural network, a generative adversarial network, or other suitable type of machine learning model. As another example, the training can be performed using either supervised or unsupervised learning.

Figure 5:
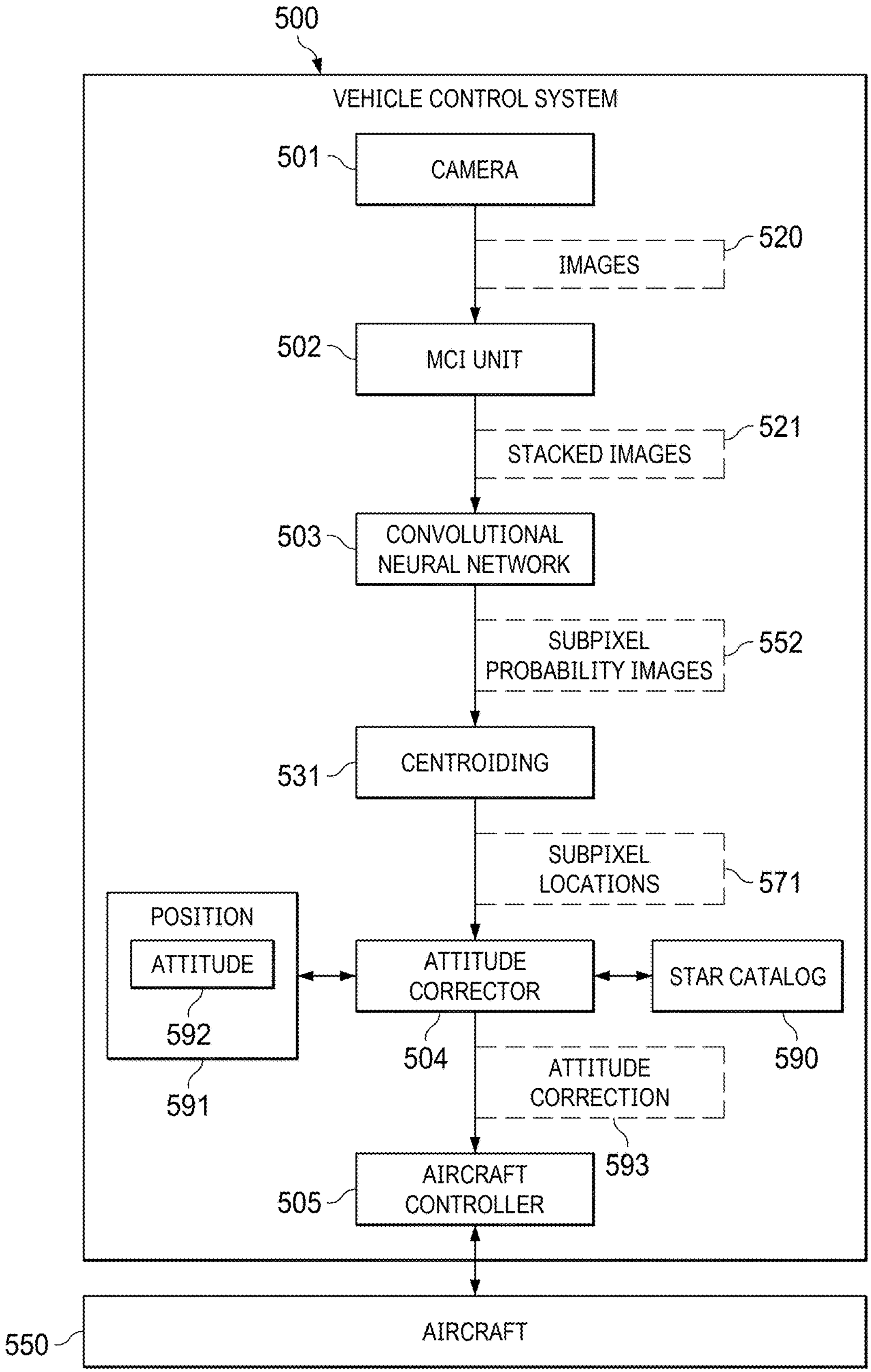
FIG. 5 is an illustration of a vehicle control system in accordance with an illustrative embodiment.

With reference next to FIG. 5, an illustration of a vehicle control system is depicted in accordance with an illustrative embodiment. In this illustrative example, vehicle control system 500 can control the operation of aircraft 550. Vehicle control system 500 is an example of one implementation for vehicle control system 202 in FIG. 2.

In this example, vehicle control system 500 comprises camera 501, motion compensated integration (MCI) unit 502, convolutional neural network 503, attitude corrector 504, and aircraft controller 505.

As depicted in this example, camera 501 generates images 520 of the sky during daylight. These images are comprised of pixels. To determine information for controlling the movement of aircraft 550, a level of precision is greater than discrete pixel locations in images 520. Thus, in this example, subpixel locations can be identified in which stars are present in images 520.

Images 520 are streaming images sent to motion compensated integration unit 502. This unit implements an image processing technique that reduces motion blur when captured images from a moving platform such as aircraft 550.

In this example, motion compensated integration unit 502 can operate to average images 520 to at least one of reduce blur or increase the signal-to-noise ratio (SNR). The results of this processing can be the creation of stacked images 521. Each stacked image in stacked images 521 is an average of a number of images 520.

Stacked images 521 are sent to convolutional neural network 503 to generate subpixel probability images 552 with subpixel locations containing probabilities of a presence of stars at the subpixel locations described by subpixel coordinates in these images.

In this example, centroiding 531 is performed on subpixel probability images 552 generated by convolutional neural network 503 to determine subpixel coordinates for subpixel locations 571 for stars in images 520. Subpixel locations 571 are examples of centroids 421 in FIG. 4.

In this illustrative example, subpixel locations 571 are used to determine position 591 of aircraft 550. For example, attitude corrector 504 can use star catalog 590 to identify position 591 of aircraft 550. This position can be at least one of an orientation or a location in three-dimensional space of aircraft 550.

In these examples, orientation is directly determined from star tracking. The location in three-dimensional space can be indirectly determined by using the orientation.

For example, orientation can be used to translate raw measurements of acceleration into a global frame of reference. In this example, the inertial measurement unit provides data on acceleration along internal axes of the inertial measurement unit. The orientation relative to a fixed external coordinate system can be used to calculate actual location changes in three dimensional space.

In this example, the orientation includes attitude 592. based on attitude 592 of aircraft 550, attitude corrector 504 can generate attitude correction 593 for aircraft 550. Aircraft controller 505 can then control aircraft 550 to have the desired attitude using attitude correction 593. In this example, aircraft controller 505 can be, for example, in autopilot, a flight management system, a surface control system, or some other suitable type of aircraft controller.

Although the illustrative example depicts vehicle control system 500 for controlling aircraft 550, vehicle control system 500 can be used to control other types of vehicles. For example, vehicle control system 500 can also be used to control movement of vehicles such as a mobile platform, an aircraft, a commercial airplane, a cargo airplane, a tilt-rotor aircraft, a tilt wing aircraft, a vertical takeoff and landing aircraft, an unmanned aerial vehicle, an artificial intelligence controlled vehicle, a drone, an electric vertical takeoff and landing vehicle, a personal air vehicle, a surface ship, a tank, a personnel carrier, a train, a spacecraft, a satellite, a space station, a submarine, a bus, an automobile, and other types of vehicles for which movement can be controlled.

Figure 6:
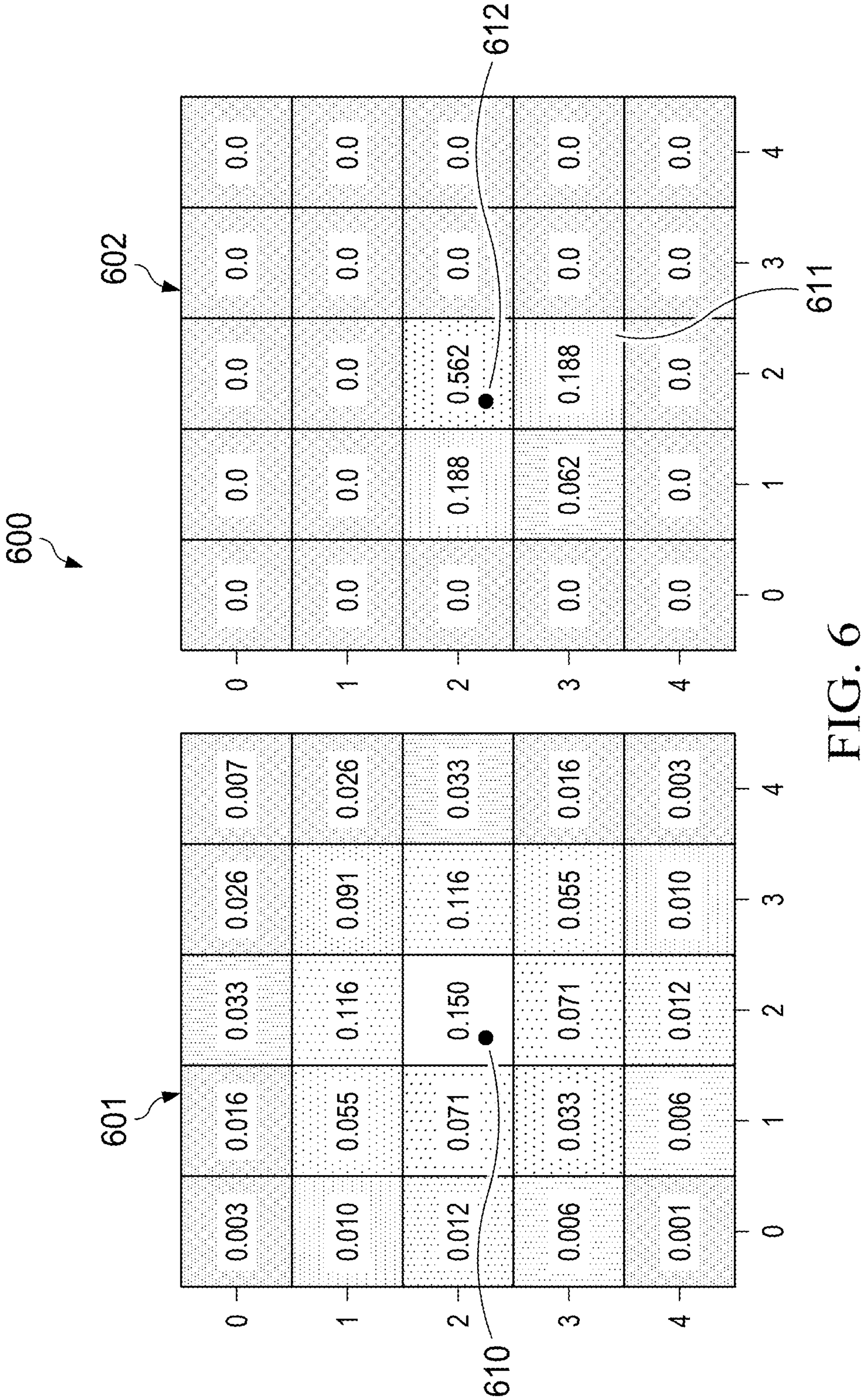
FIG. 6 is an illustration of images used to train a machine learning model in accordance with an illustrative embodiment.

With reference now to FIG. 6, an illustration of images used to train a machine learning model is depicted in accordance with an illustrative embodiment. In this example, images 600 comprises input image 601 and target image 602. Target image 602 is a corresponding image to input image 601. These images are examples of input images 402 and target images 403 used in training loop 410 in FIG. 4.

As depicted, input image 601 is a 5×5 image in which a star is located at point 610 with subpixel coordinates of (1.75, 2.25). In this example, the values at the different pixels represent pixel intensities.

Target image 602 is also a 5×5 pixel image. As pixel group 611 is a 2×2 array of pixels with probabilities of the presence of a star in each of these pixels. In this example, a star is present at coordinates (1.75, 2.25) at point 612.

For every input image I, a target image T be generated for training a convolutional neural network. n this example, the target image T has the same width and height of the input image and is initialized with zeros. The ground truth targets for the multi-instance sub-pixel localization problem are in the form of a list of continuous coordinates with one coordinate per target object (star). For every (x,y) target coordinate, the target image is populated as follows:

$$dx = x - \lfloor x \rfloor \tag{1}$$

-continued $$dy = y - \lfloor y \rfloor \tag{2}$$

$$T(\lfloor x \rfloor, \lfloor y \rfloor) = (1 - dx)(1 - dy) \tag{3}$$

$$T(\lfloor x \rfloor + 1, \lfloor y \rfloor) = dx(1 - dy) \tag{4}$$

$$T(\lfloor x \rfloor, \lfloor y \rfloor + 1) = (1 - dx)dy \tag{5}$$

$$T(\lfloor x \rfloor + 1, \lfloor y \rfloor + 1) = dxdy \tag{6}$$

In this example, dx in equation (1) and dy in equation (2) are the fractional part of the ground truth coordinate. For example, an (x,y) of (20.4, 61.873) would have dx=0.4, dy=0.873. Equations (3), (4), (5), and (6) describe how the 2×2 array of pixels is filled out in the target image. Equation (3) is top-left; equation (4) top-right; equation (5) bottom-left; and equation (6) is bottom-right. These pixel locations are derived from the typical image coordinate frame, which puts (0, 0) at the top left of the image.

In standard classification problems, the target class is given a value of 1 representing the total probability. In this example, the total probability is shared among pixels in pixel group 611, which is a 2×2 array of pixels surrounding the sub-pixel. In this case, the value of each target pixel is a function of the distance of the pixel from the sub-pixel location. This methodology assumes that the target objects are sparse meaning that no two target objects share pixels from their surrounding 2×2 arrays of pixels.

Figure 7:
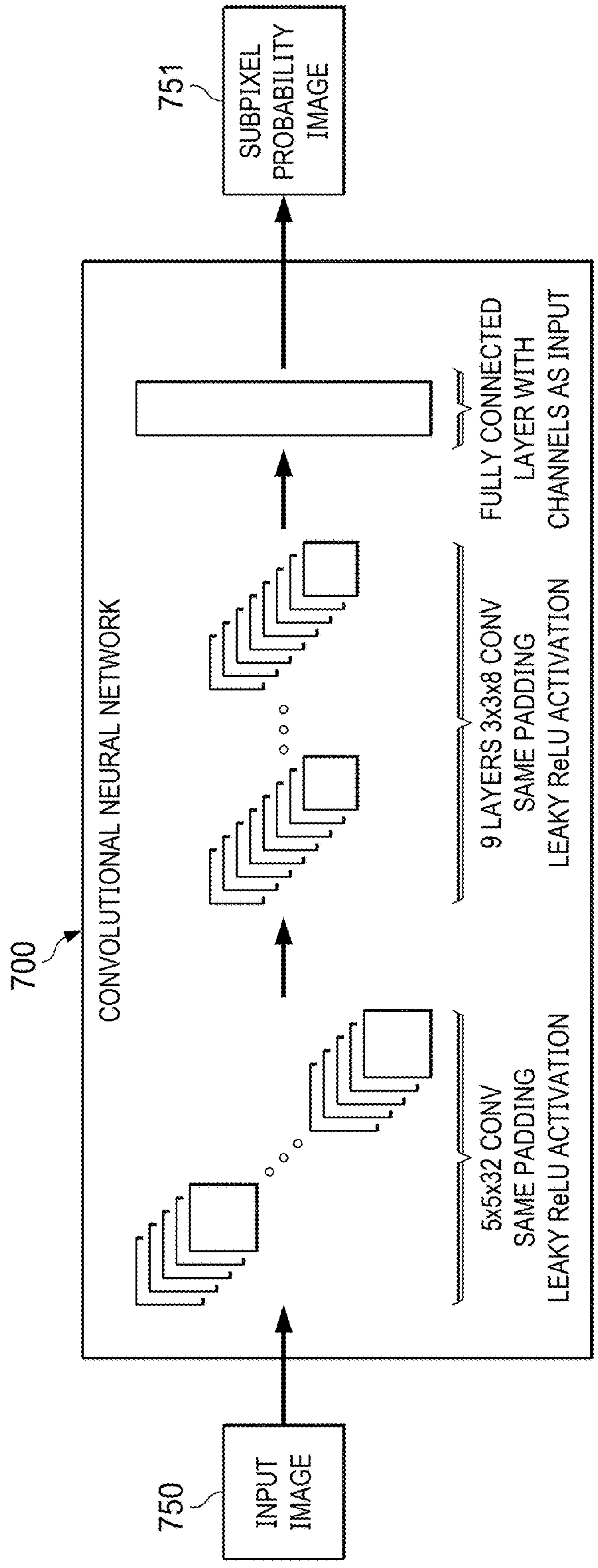
FIG. 7 is an illustration of a convolutional neural network in accordance with an illustrative embodiment.

Turning to FIG. 7, an illustration of a convolutional neural network is depicted in accordance with an illustrative embodiment. In this illustrative example, convolutional neural network 700 is an example of a machine learning model in machine learning models 220 in FIG. 2.

In this example, convolutional neural network 700 has 7,825 trainable parameters. Convolutional neural network 700 is fully convolutional in this example. The network architecture for convolutional neural network 700 in this example is selected to be fully convolutional using the "same" padding convention so that the output image has the same shape as the input image. The output of the network is passed through a sigmoid activation function which maps the output to the range (0,1). The output image and the target image are then passed to a binary cross-entropy (BCE) loss function, and the gradients are back propagated through convolutional neural network 700 to train each parameter.

Convolutional neural network 700 has been trained to receive input image 750 as an input and output subpixel probability image 751.

In this example, This convolutional neural network 700 outputs subpixel probability image 751, 0, with the same shape as the input image where each pixel represents the probability that the centroid lies within that pixel. The subpixel locations are predicted by calculating the inverse operation to the target generation described above.

In generating targets for each sub-pixel location, the total probability of 1 is distributed among the 4 pixels in the 2×2 array of pixels that surround the sub-pixel. To invert this operation, the sum of every 2×2 array of pixels in the image is calculated and saved in a total probability image P. This can be accomplished by filtering the output image, O, with a 2×2 kernel with the following entries:

$$K = \begin{bmatrix} 1 & 1 \\ 1 & 1 \end{bmatrix}.$$

This kernel is anchored at the top left pixel of the 2×2 array of pixels, so the value of each pixel in the total probability image is:

$$P(x, y) = \sum_{dx=0}^{1}\sum_{dy=0}^{1} O(x + dx, y + dy) \tag{7}$$

Equation (7) describes how to compute a probability from a 2×2 array of pixels. O is subpixel probability image 751. The total probability for coordinate (x,y) is the sum of all pixels in the 2×2 array.

Next, P is filtered to identify the 2×2 arrays of pixels whose sum is greater than a specified threshold t, and these locations are stored in a set: $S=\{(x_i, y_i)|P(x_i, y_i)>\tau\}$. Finally, to calculate the set of sub-pixel locations, for each $(x_i, y_i)\in S$ the sub-pixel location is:

$$p_i = \frac{\sum_{dx=0}^{1}\sum_{dy=0}^{1}(x_i + dx, y_i + dy)O(x_i + dx, y_i + dy)}{P(x_i, y_i)} \tag{8}$$

Equation (8) describes determining the sub-pixel location. The pixels in the 2×2 arrays of pixels in the images are summed, but in this case, weighted by the pixel coordinate. The sum is normalized by the total probability, producing a weighted average. In equation (8), $(x_i+dx, y_i+dy)$ is a vector in two dimensions. $O(x_i+dx, y_i+dy)$ is a single pixel intensity. $P_i$ is also a vector with two dimensions.

Figure 8:
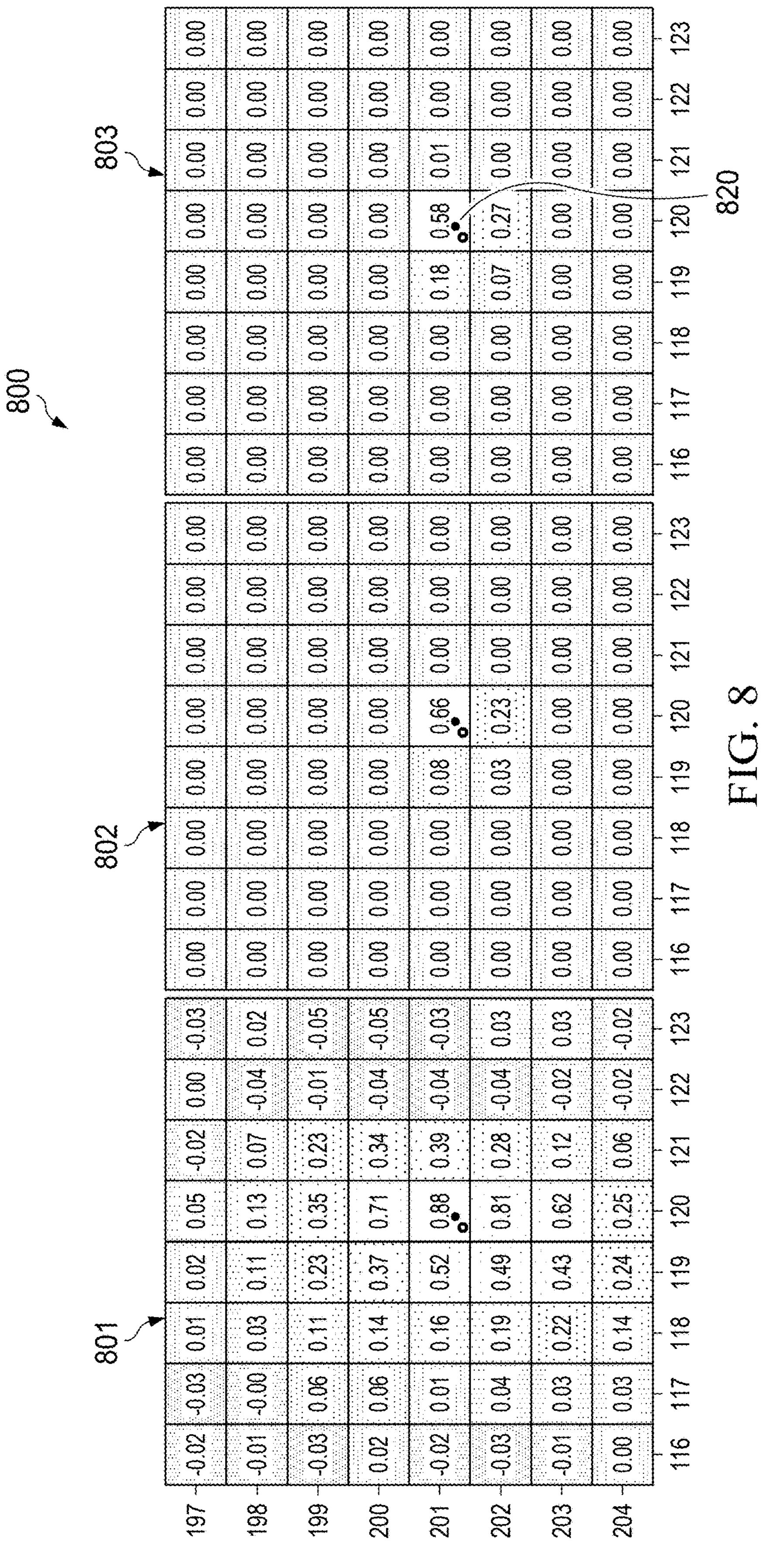
FIG. 8 is an illustration of images used in training a machine learning model in accordance with an illustrative embodiment.

Turning now to FIG. 8, an illustration of images used in training a machine learning model is depicted in accordance with an illustrative embodiment. In this example, images 800 are images that can be used in training loop 410 in FIG. 4. Images 800 comprise input image 801, subpixel probability image 802, and target image 803.

Input image 801 is an image input into a machine learning model. Subpixel probability image 802 is output by the machine learning model. This image has a predicted subpixel coordinate of (119.78, 201.31) for a star at point 820. Target image 803 identifies the probabilities based on the actual location of the star in input image 801. In other words, target image 803 is the ground truth of probabilities for the location of the star for input image 801.

In this example, the machine learning model network is trained to accurately identify the center of the star. Further, as depicted, the relative proportions of the output probabilities in subpixel probability image 802 are very similar to those in target image 803.

Figure 9:
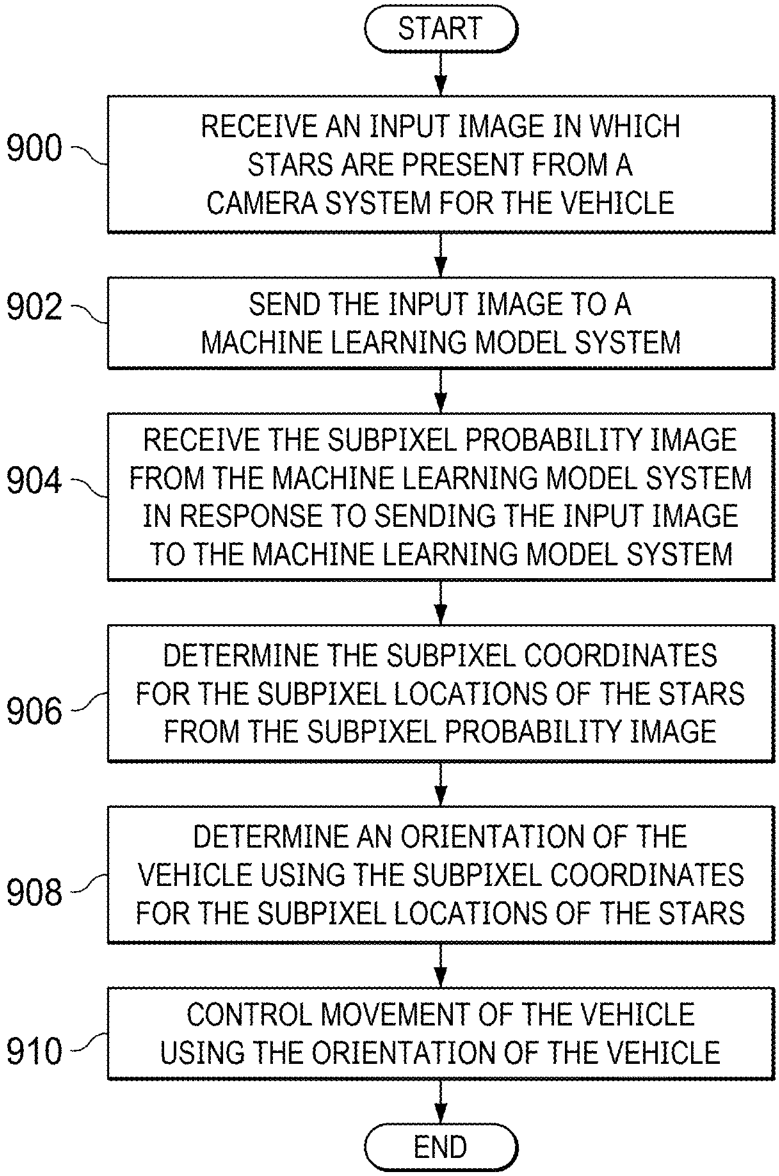
FIG. 9 is an illustration of a flowchart of a process for controlling movement of a vehicle in accordance with an illustrative embodiment.

Turning next to FIG. 9, an illustration of a flowchart of a process for controlling movement of a vehicle is depicted in accordance with an illustrative embodiment. The process in FIG. 9 can be implemented in hardware, software, or both. When implemented in software, the process can take the form of program instructions that are run by one of more processor units located in one or more hardware devices in one or more computer systems. For example, the process can be implemented in star locator 214 and vehicle controller 215 using machine learning model system 219 in computer system 212 in FIG. 2. In this example, star locator 214 uses machine learning model system 219 in FIG. 2.

The process beings by receiving an input image in which stars are present from a camera system for the vehicle (operation 900). The process sends the input image to a machine learning model system (operation 902). In operation 902, the machine learning model system has been trained to generate a subpixel probability image from the input image in which stars are present. The input image is comprised of pixels and the subpixel probability image is comprised of subpixel coordinates describing subpixel locations having probabilities of a presence of the stars.

The process receives the subpixel probability image from the machine learning model system in response to sending the input image to the machine learning model system (operation 904). The process determines the subpixel coordinates for the subpixel locations of the stars from the subpixel probability image (operation 906). In this example, operations 900-906 are implemented in star locator 214 in FIG. 2.

The process determines an orientation of the vehicle using the subpixel coordinates for the subpixel locations of the stars (operation 908). The process controls movement of the vehicle using the orientation of the vehicle (operation 910). The process terminates thereafter. In this example, operations 908-910 are implemented in vehicle controller 215 in FIG. 2.

Figure 10:
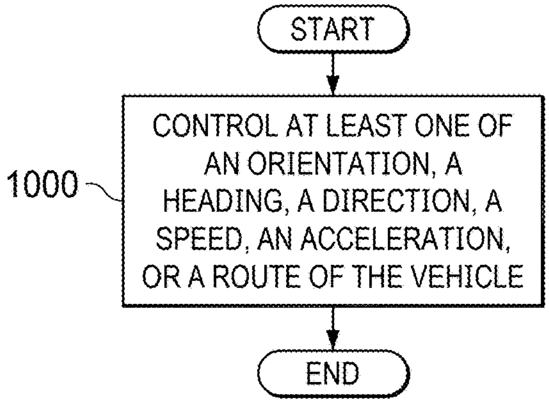
FIG. 10 is an illustration of a flowchart of a process for controlling movement of a vehicle in accordance with an illustrative embodiment.

Turning next to FIG. 10, an illustration of a flowchart of a process for controlling movement of a vehicle is depicted in accordance with an illustrative embodiment. This flowchart is an example of an implementation for operation 908 in FIG. 9.

The process controls at least one of an orientation, a heading, a direction, a speed, an acceleration, or a route of the vehicle (operation 1000). The process terminates thereafter.

Figure 11:
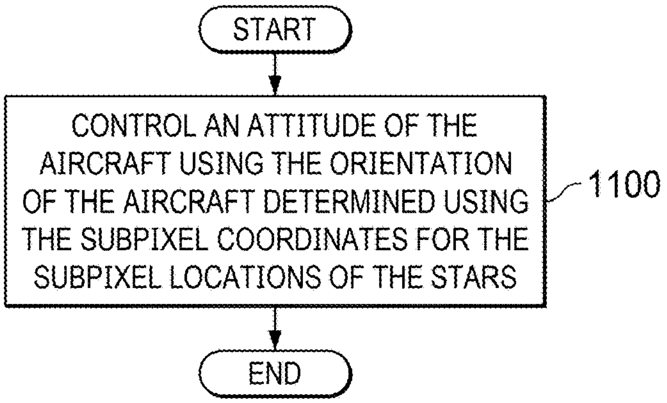
FIG. 11 is an illustration of a flowchart of a process for controlling movement of a vehicle in accordance with an illustrative embodiment.

With reference next to FIG. 11, an illustration of a flowchart of a process for controlling movement of a vehicle is depicted in accordance with an illustrative embodiment. This flowchart is an example of an implementation for operation 908 in FIG. 9. In this example, the vehicle is an aircraft.

The process controls an attitude of the aircraft using the orientation of the aircraft determined using the subpixel coordinates for the subpixel locations of the stars (operation 1100). The process terminates thereafter.

Figure 12:
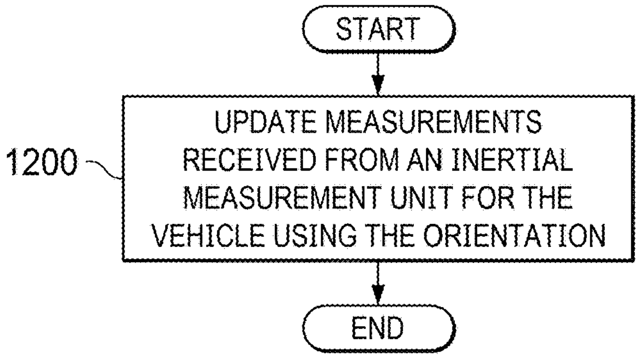
FIG. 12 is an illustration of a flowchart of a process for controlling movement of a vehicle in accordance with an illustrative embodiment.

Turning now to FIG. 12, an illustration of a flowchart of a process for controlling movement of a vehicle is depicted in accordance with an illustrative embodiment. This flowchart is an example of an implementation for operation 908 in FIG. 9.

The process updates measurements received from an inertial measurement unit for the vehicle using the orientation (operation 1200). The process terminates thereafter.

Figure 13:
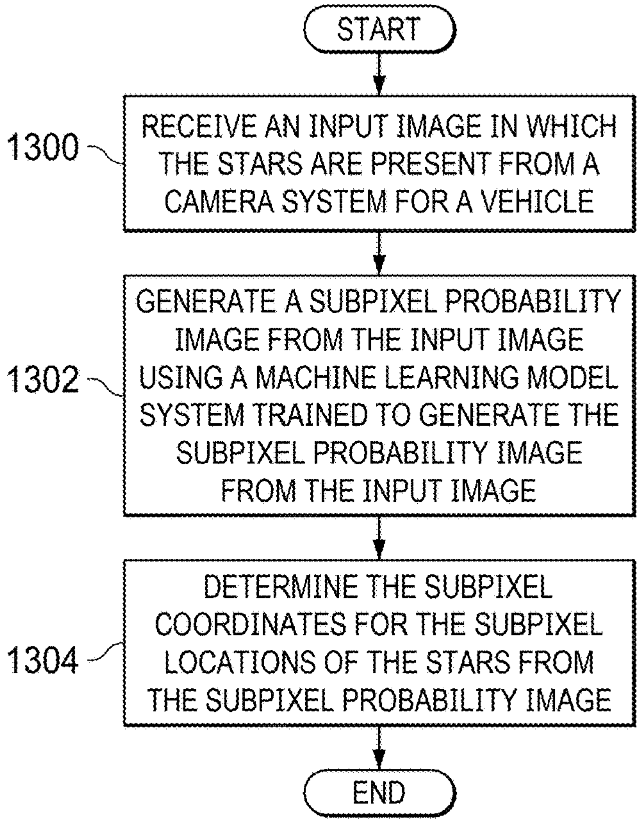
FIG. 13 is an illustration of a flowchart of a process for determining subpixel locations of stars in an input image in accordance with an illustrative embodiment.

Turning next to FIG. 13, an illustration of a flowchart of a process for determining subpixel locations of stars in an input image is depicted in accordance with an illustrative embodiment. The process in FIG. 13 can be implemented in hardware, software, or both. When implemented in software, the process can take the form of program instructions that are run by one of more processor units located in one or more hardware devices in one or more computer systems. The process in this illustrative example can be implemented in star locator 214 in FIG. 2.

The process begins by receiving an input image in which the stars are present from a camera system for a vehicle (operation 1300). In operation 1300, the input image is comprised of pixels.

The process generates a subpixel probability image from the input image using a machine learning model system trained to generate the subpixel probability image from the input image (operation 1302). In operation 1302, the machine learning model system has been trained to generate the subpixel probability image from the input image in which the input image is comprised of pixels and the subpixel probability image is comprised of the subpixel coordinates describing the subpixel locations having probabilities of a presence of the stars.

The process determines the subpixel coordinates for the subpixel locations of the stars from the subpixel probability image (operation 1304). The process terminates thereafter.

Figure 14:
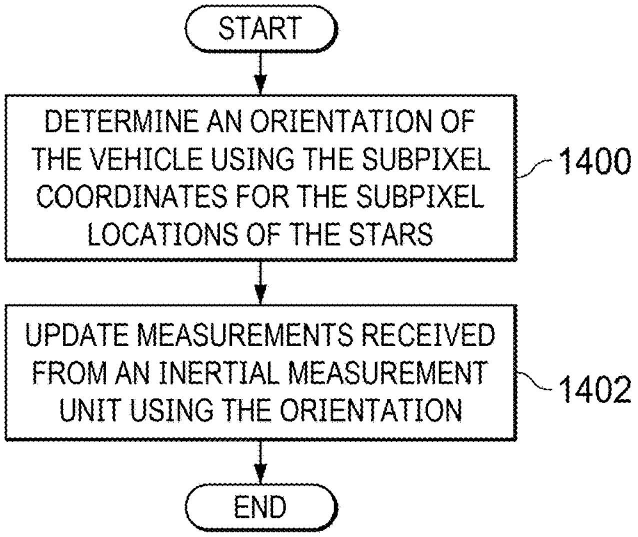
FIG. 14 is an illustration of a flowchart of a process for controlling movement of a vehicle in accordance with an illustrative embodiment.

Turning now to FIG. 14, an illustration of a flowchart of a process for controlling movement of a vehicle is depicted in accordance with an illustrative embodiment. This flowchart is an example of additional operations that can be performed with the operations in FIG. 13.

The process determines an orientation of the vehicle using the subpixel coordinates for the subpixel locations of the stars (operation 1400). The process updates measurements received from an inertial measurement unit using the orientation (operation 1402). The process terminates thereafter.

Figure 15:
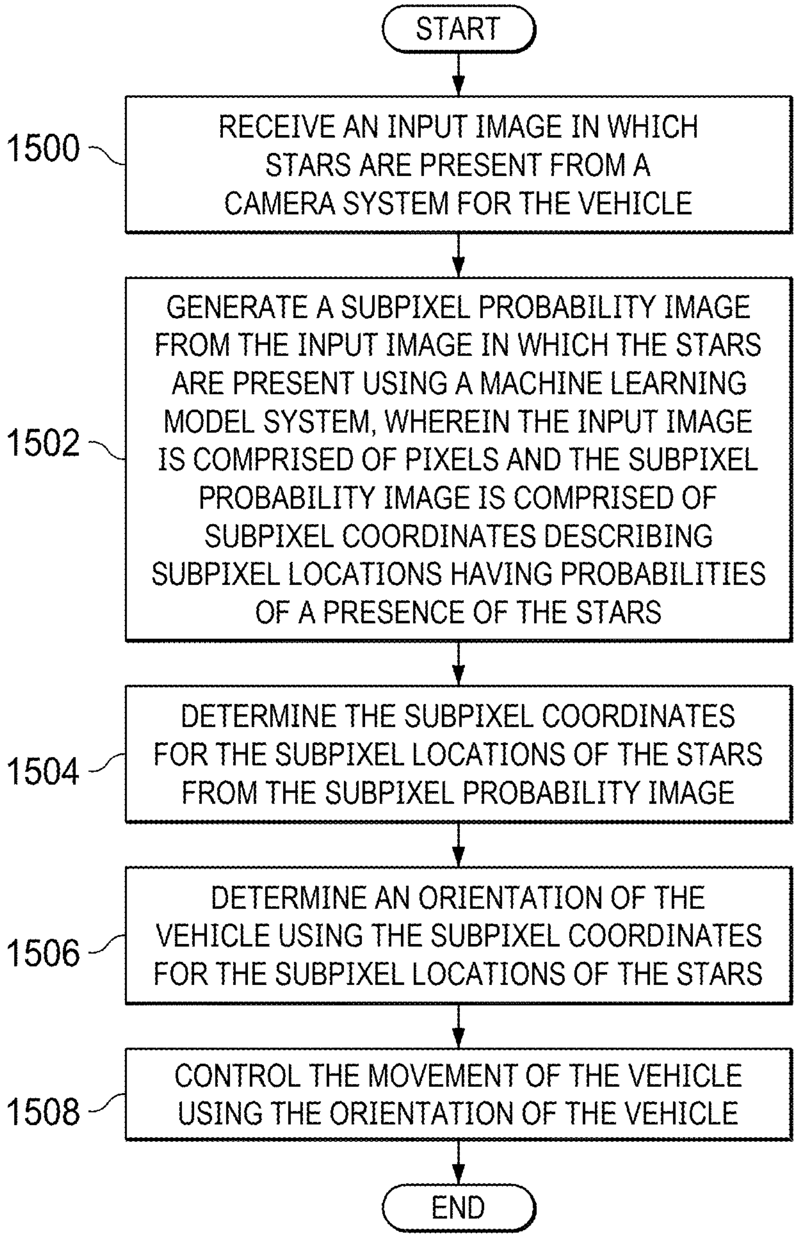
FIG. 15 is an illustration of a flowchart of a process for controlling movement of a vehicle in accordance with an illustrative environment.

Next in FIG. 15, an illustration of a flowchart of a process for controlling movement of a vehicle is depicted in accordance with an illustrative environment. The process in FIG. 15 can be implemented in hardware, software, or both. When implemented in software, the process can take the form of program instructions that are run by one of more processor units located in one or more hardware devices in one or more computer systems. For example, the process can be implemented in star locator 214 and vehicle controller 215 using machine learning model system 219 in computer system 212 in FIG. 2.

The process begins by receiving an input image in which stars are present from a camera system for the vehicle (operation 1500). The process generates a subpixel probability image from the input image in which the stars are present using a machine learning model system, wherein the input image is comprised of pixels and the subpixel probability image is comprised of subpixel coordinates describing subpixel locations having probabilities of a presence of the stars (operation 1502).

The process determines the subpixel coordinates for the subpixel locations of the stars from the subpixel probability image (operation 1504). The process determines an orientation of the vehicle using the subpixel coordinates for the subpixel locations of the stars (operation 1506).

The process controls the movement of the vehicle using the orientation of the vehicle (operation 1508). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 16:
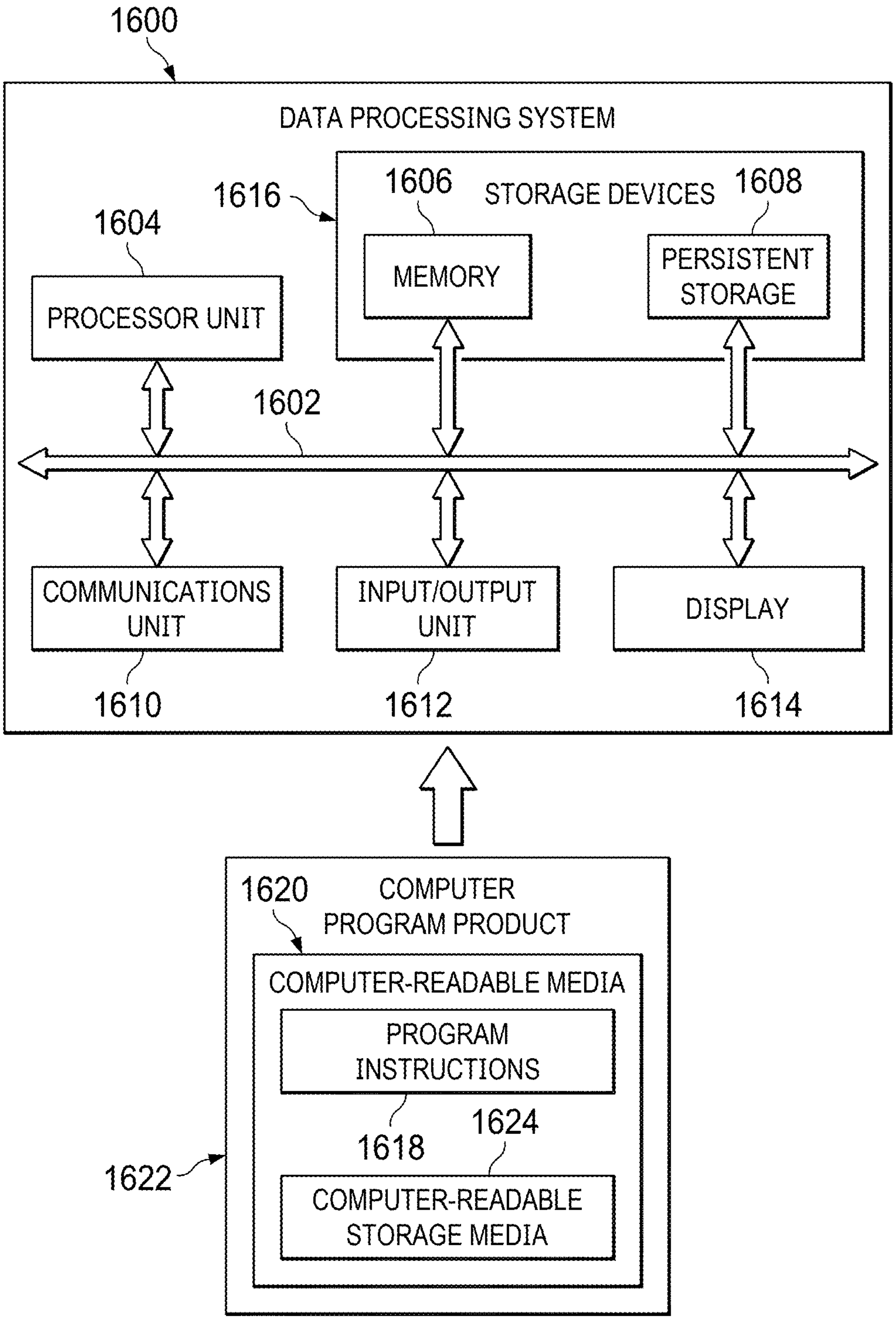
FIG. 16 is an illustration of a block diagram of a data processing system in accordance with an illustrative embodiment.

Turning now to FIG. 16, a block diagram of a data processing system is depicted in accordance with an illustrative embodiment. Data processing system 1600 can be used to implement computer system 212 in FIG. 2. In this illustrative example, data processing system 1600 includes communications framework 1602, which provides communications between processor unit 1604, memory 1606, persistent storage 1608, communications unit 1610, input/output (I/O) unit 1612, and display 1614. In this example, communications framework 1602 takes the form of a bus system.

Processor unit 1604 serves to execute instructions for software that can be loaded into memory 1606. Processor unit 1604 includes one or more processors. For example, processor unit 1604 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1604 can be implemented using one or more heterogeneous processor systems in which a main processor is present with secondary processors on a single chip. As another illustrative example, processor unit 1604 can be a symmetric multi-processor system containing multiple processors of the same type on a single chip.

Memory 1606 and persistent storage 1608 are examples of storage devices 1616. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1616 may also be referred to as computer-readable storage devices in these illustrative examples. Memory 1606, in these examples, can be, for example, a random-access memory or any other suitable volatile or non-volatile storage device. Persistent storage 1608 may take various forms, depending on the particular implementation.

For example, persistent storage 1608 may contain one or more components or devices. For example, persistent storage 1608 can be a hard drive, a solid-state drive (SSD), a flash memory, a rewritable optical disk, a rewritable magnetic tape, or some combination of the above. The media used by persistent storage 1608 also can be removable. For example, a removable hard drive can be used for persistent storage 1608.

Communications unit 1610, in these illustrative examples, provides for communications with other data processing systems or devices. In these illustrative examples, communications unit 1610 is a network interface card.

Input/output unit 1612 allows for input and output of data with other devices that can be connected to data processing system 1600. For example, input/output unit 1612 may provide a connection for user input through at least one of a keyboard, a mouse, or some other suitable input device. Further, input/output unit 1612 may send output to a printer. Display 1614 provides a mechanism to display information to a user.

Instructions for at least one of the operating system, applications, or programs can be located in storage devices 1616, which are in communication with processor unit 1604 through communications framework 1602. The processes of the different embodiments can be performed by processor unit 1604 using computer-implemented instructions, which may be located in a memory, such as memory 1606.

These instructions are referred to as program instructions, computer usable program instructions, or computer-readable program instructions that can be read and executed by a processor in processor unit 1604. The program instructions in the different embodiments can be embodied on different physical or computer-readable storage media, such as memory 1606 or persistent storage 1608.

Program instructions 1618 are located in a functional form on computer-readable media 1620 that is selectively removable and can be loaded onto or transferred to data processing system 1600 for execution by processor unit 1604. Program instructions 1618 and computer-readable media 1620 form computer program product 1622 in these illustrative examples. In the illustrative example, computer-readable media 1620 is computer-readable storage media 1624.

Computer-readable storage media 1624 is a physical or tangible storage device used to store program instructions 1618 rather than a medium that propagates or transmits program instructions 1618. Computer-readable storage media 1624 may be at least one of an electronic storage medium, a magnetic storage medium, an optical storage medium, an electromagnetic storage medium, a semiconductor storage medium, a mechanical storage medium, or other physical storage medium. Some known types of storage devices that include these mediums include: a diskette, a hard disk, a random access memory (RAM), a read-only memory (ROM), an erasable programmable read-only memory (EPROM or Flash memory), a static random access memory (SRAM), a compact disc read-only memory (CD-ROM), a digital versatile disk (DVD), a memory stick, a floppy disk, a mechanically encoded device, such as punch cards or pits/lands formed in a major surface of a disc, or any suitable combination thereof.

Computer-readable storage media 1624, as that term is used in the present disclosure, is not to be construed as storage in the form of transitory signals per se, such as at least one of radio waves or other freely propagating electromagnetic waves, electromagnetic waves propagating through a waveguide, light pulses passing through a fiber optic cable, electrical signals communicated through a wire, or other transmission media.

Further, data can be moved at some occasional points in time during normal operations of a storage device. These normal operations include access, de-fragmentation or garbage collection. However, these operations do not render the storage device as transitory because the data is not transitory while the data is stored in the storage device.

Alternatively, program instructions 1618 can be transferred to data processing system 1600 using a computer-readable signal media. The computer-readable signal media are signals and can be, for example, a propagated data signal containing program instructions 1618. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1620" can be singular or plural. For example, program instructions 1618 can be located in computer-readable media 1620 in the form of a single storage device or system. In another example, program instructions 1618 can be located in computer-readable media 1620 that is distributed in multiple data processing systems. In other words, some instructions in program instructions 1618 can be located in one data processing system while other instructions in program instructions 1618 can be located in one data processing system. For example, a portion of program instructions 1618 can be located in computer-readable media 1620 in a server computer while another portion of program instructions 1618 can be located in computer-readable media 1620 located in a set of client computers.

The different components illustrated for data processing system 1600 are not meant to provide architectural limitations to the manner in which different embodiments can be implemented. In some illustrative examples, one or more of the components may be incorporated in or otherwise form a portion of, another component. For example, memory 1606, or portions thereof, may be incorporated in processor unit 1604 in some illustrative examples. The different illustrative embodiments can be implemented in a data processing system including components in addition to or in place of those illustrated for data processing system 1600. Other components shown in FIG. 16 can be varied from the illustrative examples shown. The different embodiments can be implemented using any hardware device or system capable of running program instructions 1618.

Thus, the illustrative examples provides a method, apparatus, system, and computer program product for controlling movement of the vehicle. Further, the illustrative examples provide an ability to determine the orientation of a vehicle using images of stars generated during daylight.

In one illustrative example, a method controls a movement of a vehicle. An input image of a sky in which stars are present is received from a camera system for the vehicle. A subpixel probability image is generated by a machine learning model system from the input image in which the stars are present, wherein the input image is comprised of pixels and the subpixel probability image is comprised of subpixel coordinates describing subpixel locations having probabilities of a presence of the stars. The subpixel coordinates for the subpixel locations of the stars is generated from the subpixel probability image. An orientation of the vehicle is determined using the subpixel coordinates for the subpixel locations of the stars. The movement of the vehicle is controlled using the orientation of the vehicle.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A vehicle control system comprising:

a computer system;

a machine learning model system in the computer system, wherein the machine learning model system has been trained to generate a subpixel probability image from an input image in which stars are present, wherein the input image is comprised of pixels and the subpixel probability image is comprised of subpixel coordinates describing subpixel locations having probabilities of a presence of the stars; and a star locator in the computer system, wherein the star locator is configured to:

receive the input image in which the stars are present from a camera system for a vehicle;

send the input image to the machine learning model system;

receive the subpixel probability image from the machine learning model system in response to sending the input image to the machine learning model system; and determine the subpixel coordinates for the subpixel locations of the stars using the subpixel probability image; and a vehicle controller for the vehicle in the computer system, wherein the vehicle controller is configured to:

determine an orientation of the vehicle using the subpixel coordinates for the subpixel locations of the stars; and control a movement of the vehicle using the orientation of the vehicle.

2. The vehicle control system of claim 1, wherein in controlling the movement of the vehicle, the vehicle controller controls at least one of the orientation, a heading, a direction, a speed, an acceleration, or a route of the vehicle.

3. The vehicle control system of claim 1, wherein the vehicle is an aircraft and the vehicle controller is configured to:

control an attitude of the aircraft using the orientation of the aircraft determined using the subpixel coordinates for locations of the stars.

4. The vehicle control system of claim 1 further comprising:

a training dataset comprising input images and target images; and a trainer in the computer system, wherein the trainer is configured to train the machine learning model system using the training dataset.

5. The vehicle control system of claim 1, wherein a star in the stars has the subpixel coordinates for a subpixel location of the star.

6. The vehicle control system of claim 5, wherein the subpixel coordinates for the subpixel location of the star is within a 2×2 array of pixels in the input image.

7. The vehicle control system of claim 1, wherein the machine learning model system is selected from at least one of a centroid quad network, a convolutional neural network, a recurrent neural network, or a generative adversarial network.

8. The vehicle control system of claim 1, wherein the vehicle is selected from a group comprising a mobile platform, an aircraft, a commercial airplane, a cargo airplane, a tilt-rotor aircraft, a tilt wing aircraft, a vertical takeoff and landing aircraft, an unmanned aerial vehicle, an artificial intelligence controlled vehicle, a drone, an electric vertical takeoff and landing vehicle, a personal air vehicle, a surface ship, a tank, a personnel carrier, a train, a spacecraft, a satellite, a space station, a space station, a submarine, a bus, a land-based system, and an automobile.

9. A star navigation system comprising:

a set of computer-readable storage media; and program instructions stored on the set of computer-readable storage media to perform operations comprising:

receiving an input image in which stars are present from a camera system for a vehicle; and generating a subpixel probability image from the input image using a machine learning model system trained to generate the subpixel probability image from the input image, wherein the input image is comprised of pixels and the subpixel probability image is comprised of the subpixel coordinates describing subpixel locations having probabilities of a presence of the stars;

determining the subpixel coordinates for the subpixel locations of the stars from the subpixel probability image;

determining an orientation of the vehicle using the subpixel coordinates for the subpixel locations of the stars; and controlling a movement of the vehicle using the orientation of the vehicle.

10. The star navigation system of claim 9, wherein the operations further comprise:

determining an orientation of the vehicle using the subpixel coordinates for the subpixel locations of the stars; and updating measurements received from an inertial measurement unit using the orientation.

11. The star navigation system of claim 9, wherein the machine learning model system is selected from at least one of a centroid quad network, a convolutional neural network, a recurrent neural network, or a generative adversarial network.

12. A method for controlling a movement of a vehicle, the method comprising:

receiving an input image in which stars are present from a camera system for the vehicle;

generating a subpixel probability image from the input image in which the stars are present using a machine learning model system, wherein the input image is comprised of pixels and the subpixel probability image is comprised of subpixel coordinates describing subpixel locations having probabilities of a presence of the stars;

determining the subpixel coordinates for the subpixel locations of the stars from the subpixel probability image;

determining an orientation of the vehicle using the subpixel coordinates for the subpixel locations of the stars; and controlling the movement of the vehicle using the orientation of the vehicle.

13. The method of claim 12, wherein in controlling the movement of the vehicle comprises:

controlling at least one of the orientation, a heading, a direction, a speed, an acceleration, or a route of the vehicle.

14. The method of claim 12, wherein the vehicle is an aircraft and controlling the movement of the vehicle comprises:

controlling an attitude of the aircraft using the orientation of the aircraft determined using the subpixel coordinates for the subpixel locations of the stars.

15. The method of claim 12, wherein a star in the stars has the subpixel coordinates for a subpixel location of the star.

16. The method of claim 15, wherein a set of subpixel coordinates for the subpixel location of the star is within a 2×2 array of pixels in the input image.

17. The method of claim 12, wherein the machine learning model system is selected from at least one of a centroid quad network, a convolutional neural network, a recurrent neural network, or a generative adversarial network.

18. The method of claim 12, wherein the vehicle is selected from a group comprising a mobile platform, an aircraft, a commercial airplane, a cargo airplane a tilt-rotor aircraft, a tilt wing aircraft, a vertical takeoff and landing aircraft, an unmanned aerial vehicle, an artificial intelligence controlled vehicle, a drone, an electric vertical takeoff and landing vehicle, a personal air vehicle, a surface ship, a tank, a personnel carrier, a train, a spacecraft, a satellite, a space station, a submarine, a bus, a land-based system, and an automobile.

19. A computer program product comprising a computer-readable storage medium having program instructions embodied therewith, the program instructions executable by a computer system to cause the computer system to perform a method of:

receiving an input image in which stars are present from a camera system for a vehicle;

receiving subpixel coordinates for subpixel locations of the stars in response to sending the input image into a machine learning model system, wherein the machine learning model system has been trained to generate a subpixel probability image from the input image in which stars are present, wherein the input image is comprised of pixels and the subpixel probability image is comprised of subpixel coordinates describing subpixel locations having probabilities of a presence of the stars;

generating the subpixel coordinates for the subpixel locations of the stars from the subpixel probability image;

determining an orientation of the vehicle using the subpixel coordinates for the subpixel locations of the stars; and controlling a movement of the vehicle using the orientation of the vehicle.

* * * * *